United States Patent
Han et al.

[11] Patent Number: 6,135,256
[45] Date of Patent: Oct. 24, 2000

[54] WET FRICTION DISC CLUTCH

[75] Inventors: Zhi-Peng Han; Yuzuru Sanbongi, both of Hokkaido, Japan

[73] Assignee: Dynax Corporation, Hokkaido, Japan

[21] Appl. No.: 08/988,430

[22] Filed: Dec. 10, 1997

[30] Foreign Application Priority Data

Dec. 10, 1996 [JP] Japan .................................. 8-344479

[51] Int. Cl.[7] .................................................. F16D 13/72
[52] U.S. Cl. ...................... 192/70.12; 192/70.14; 192/113.36
[58] Field of Search .............. 192/70.12, 70.14, 192/113.36; 188/264 E

[56] References Cited

U.S. PATENT DOCUMENTS

| | | | |
|---|---|---|---|
| 1,380,823 | 6/1921 | Matthews et al. | 192/113.36 X |
| 2,743,792 | 5/1956 | Ransom | 192/113.36 X |
| 2,850,118 | 9/1958 | Byers | 192/70.14 X |
| 3,025,686 | 3/1962 | Lewis | 192/113.36 X |
| 3,063,531 | 11/1962 | Aschauer | 192/113.36 |
| 4,286,694 | 9/1981 | Wiseman, Jr. et al. | 192/70.14 X |
| 4,378,061 | 3/1983 | Schierling et al. | 192/70.14 X |
| 4,537,299 | 8/1985 | Fukatani | 192/70.14 X |
| 4,958,712 | 9/1990 | Suganuma et al. | 192/70.12 |
| 5,094,331 | 3/1992 | Fujimoto et al. | 192/70.12 |
| 5,101,953 | 4/1992 | Payvar | 192/113.36 X |
| 5,176,236 | 1/1993 | Ghidorzi et al. | 192/70.12 X |
| 5,240,095 | 8/1993 | Shimamura et al. | 192/70.12 |
| 5,335,765 | 8/1994 | Takakura et al. | 192/70.12 X |
| 5,671,835 | 9/1997 | Tanaka et al. | 192/70.12 X |
| 5,682,971 | 11/1997 | Takakura et al. | 192/70.12 X |

FOREIGN PATENT DOCUMENTS 4-19425  1/1992  Japan ............................. 192/113.36

*Primary Examiner*—Rodney H. Bonck
*Attorney, Agent, or Firm*—Lightbody & Lucas

[57] ABSTRACT

A friction disc clutch utilizes different patterns and sizing of the oil dispersal grooves of interleaved toothed discs such that the removal of oil from the friction material is promoted, particularly from the disc that rotates at a lower speed.

5 Claims, 6 Drawing Sheets

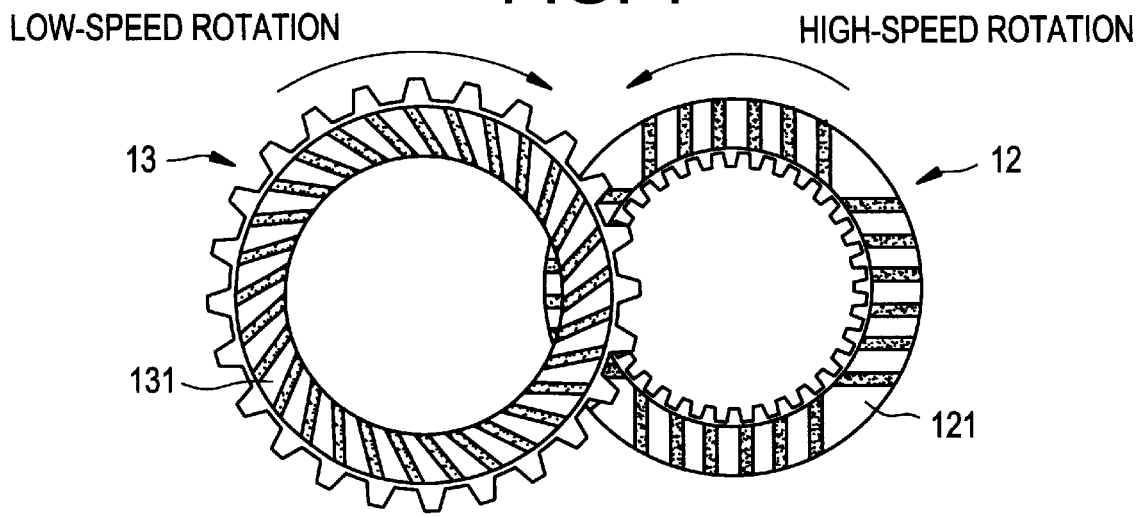
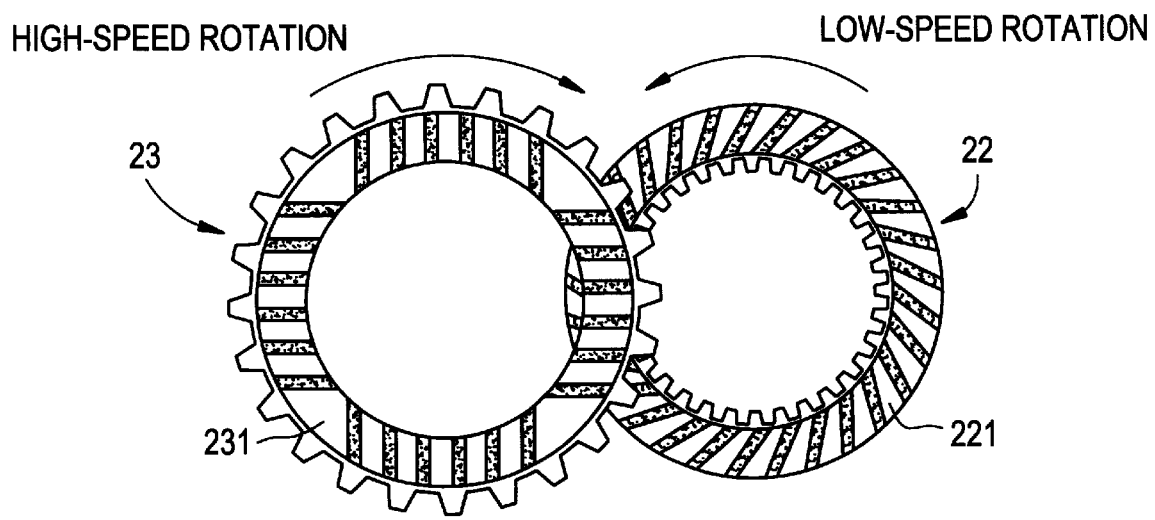

WET FRICTION DISC CLUTCH

INDUSTRIAL FIELD OF UTILIZATION

The present invention pertains to a technical field of a friction disc clutch for use in automatic transmission or the like.

PRIOR ART

A friction disc clutch is such that when a disc (friction disc) and a mating disc which are supported so as to rotate and to which friction materials are fixed, respectively, are pressed against each other, torque is transmitted by frictional force.

Although large quantity of heat is generated by friction upon such friction engagement, the quantity of heat cannot be immediately discharged to the outside. Consequently, the friction disc and the mating disc are requested to have function of absorbing heat for certain time after start of the heat generation.

The friction material usually has thermal insulating characteristic, so that the frictional heat is hardly transmitted to a disc on the back of the friction material, but is entirely transmitted to the mating disc. Therefore, in case of a "both sided" friction disc clutch formed by a combination of friction discs to which the friction materials are fixed on both faces and mating discs to which no friction materials are fixed, the friction discs do not contribute to the thermal absorption. The capacity of the friction discs are therefore wasted from a point of view of heat absorption capacity occupied by the friction disc clutch in the whole capacity.

BRIEF DESCRIPTION OF THE DRAWINGS

FIG. 1 is a frontal view of an embodiment when an inside toothed disc rotates at higher speed than an outside toothed disc in a disengagement state.

FIG. 2 is a frontal view of an embodiment when an outside toothed disc rotates at higher speed than an inside toothed disc in a disengagement state.

PREFERRED EMBODIMENT OF THE INVENTION

A "one-sided" friction disc clutch as an object of the invention deals with the above mentioned problem of the "both sided" friction disc clutch, in which discs are not discriminated between the friction disc and the mating disc but one side of each disc to which the friction material is fixed functions as a friction material face and the other side functions as a mating face. Since all of the discs have consequently the heat absorption capability, the capacity of the friction disc clutch can be effectively used.

Figure 9:
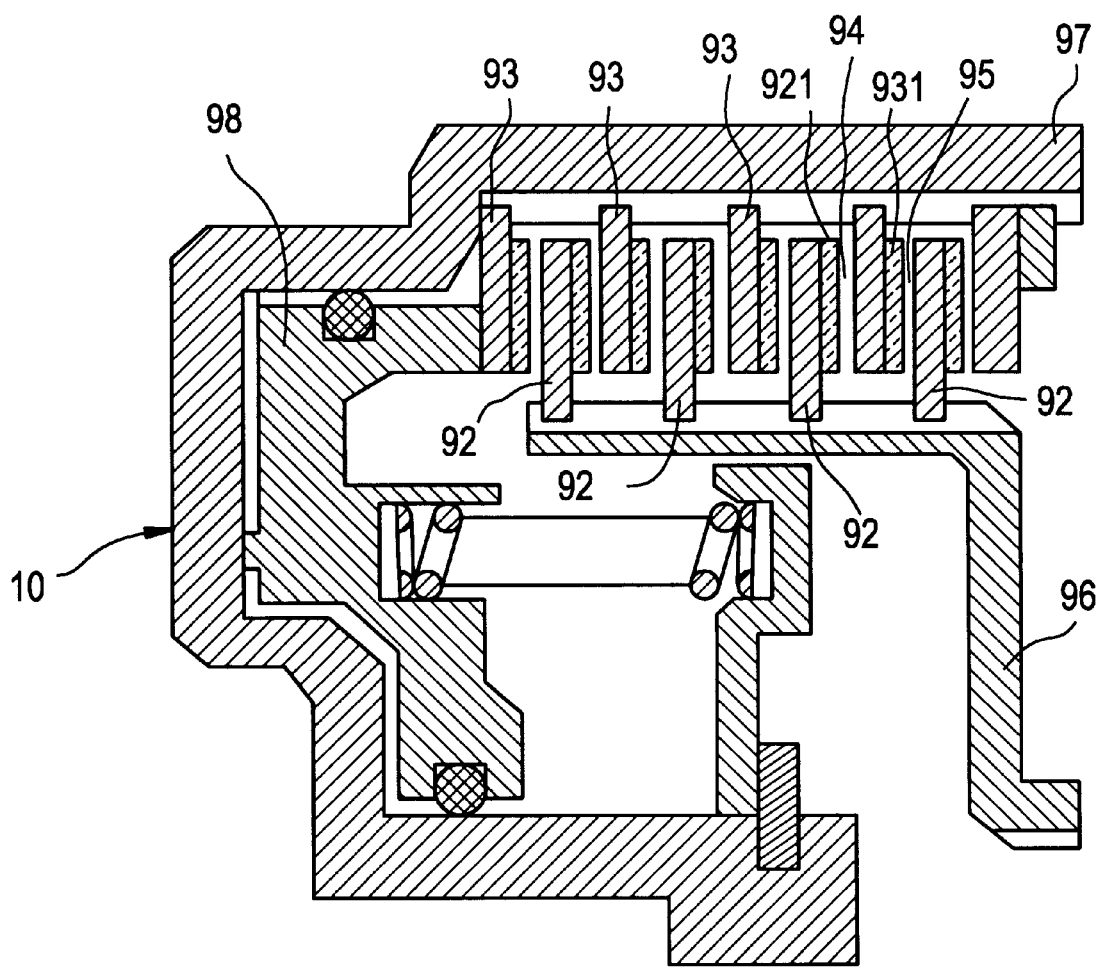
FIG. 9 is an axial cross section of a one-sided wet friction disc clutch.

A "one-sided" wet friction disc clutch 10 is shown in FIG. 9.

In the "one-sided" wet friction disc clutch 10, inside toothed discs 92 spline fitted into a hub 96 and outside toothed discs 93 spline fitted into a drum 97 are alternately arranged. Friction materials 921 and 931 are stuck to one side in the axial direction of the inside toothed discs 92 and the outside toothed discs 93, respectively. When a hydraulic piston 98 is moved in the axial direction, the inside toothed discs 92 and the outside toothed discs 93 are engaged with each other and torque is transmitted.

In case of a friction disc clutch used for automatic transmission, lubricating oil is supplied for cooling to the friction faces, so that the friction disc clutch is of "wet type".

Figure 10:
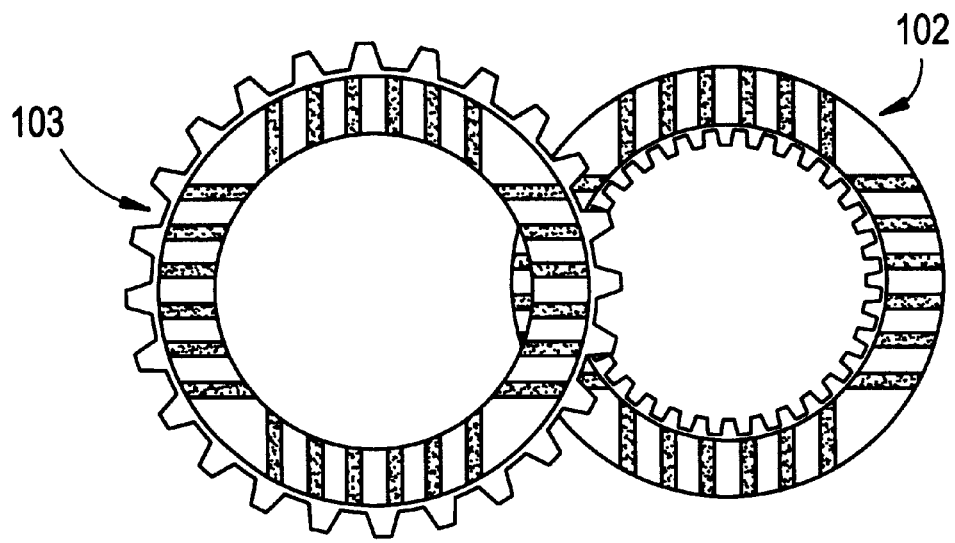
FIG. 10 is a frontal view of a conventional combining structure of discs.
Figure 11:
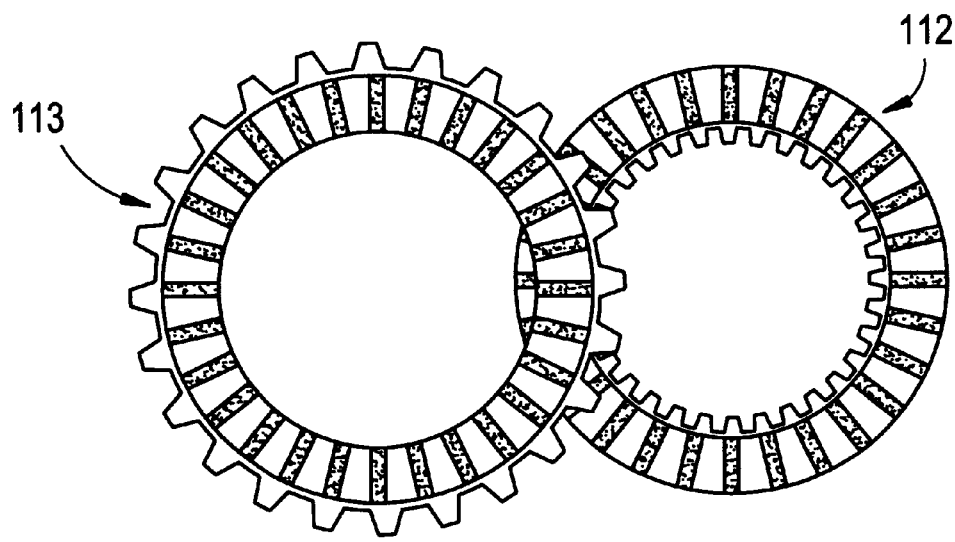
FIG. 11 is a frontal view of another conventional combining structure of discs.

Combination of an inside toothed disc 102 and an outside toothed disc 103 of FIG. 10 and combination of an inside toothed disc 112 and an outside toothed disc 113 of FIG. 11 are shown as two examples of conventional modes of the inside toothed disc 92 and the outside toothed disc 93 in FIG. 9.

In the one-sided friction disc clutch 10, in a disengagement state where the inside toothed disc 92 and the outside toothed disc 93 are not engaged with each other, the inside toothed disc 92 and the outside toothed disc 93 rotate at different speeds. Usually, a disc connected to a drive side such as an engine rotates faster than a disc on a not-driven side.

In the disengagement state, the friction material 921 on the inside toothed disc 92 faces a mating face generally made of a steel of the outside toothed disc 93 and a friction face 94 is formed between the friction material 921 and the mailing face via lubricating oil. The friction material 931 on the outside toothed disc 93 faces the mating face on the inside toothed disc 92 and a friction face 95 is formed between the friction material 931 and the mating face via the lubricating oil.

Generally, although the lubricating oil lying on the friction face rotates in associate with rotation of the friction material and the facing steel face, since the friction material is made of a porous material or the like in many cases, the friction material has higher stickiness to the lubricating oil as compared with the mating face opposite to the friction material. Rotational speed of the lubricating oil is, therefore, influenced by the rotational speed of the friction material more than the rotational speed of the opposite mating face.

The lubricating oil lying on the friction face is to be removed from the friction face to the outside in the radial direction by action of the centrifugal force by the rotating movement of the disc. The tendency becomes naturally stronger as the rotational speed increases.

When the tendency that the lubricating oil is removed from the friction face by the centrifugal force becomes stronger and the removed amount becomes larger than the supply amount, the content of air in the lubricating oil on the friction face increases. So-called "drag torque" in the friction disc clutch is caused by shearing resistance of the lubricating oil. When the content of air in the lubricating oil on the friction face increases, the shearing resistance decreases, and as a result, the drag torque is reduced. on the other hand, when the removing performance of the lubricating oil is weak, the drag torque increases.

When the removing performance of the oil is strong on the friction face, oil film pressure is relatively is low as compared with the case where the removing performance of the oil is weak. In FIG. 9, when the inside toothed disc 92 rotates at higher speed than the outside toothed disc 93, the friction material 921 rotates on the friction face 94 at higher speed than the opposite mating face of the outside toothed disc 93, and the friction material 931 rotates on the friction face 95 at lower speed than the opposite mating face of the inside toothed disc 92.

The moving speed of the lubricating oil lying on the friction face 94 is, consequently, lower than the moving speed of the lubricating oil lying on the friction face 95.

Consequently, on the friction face 94, the removing performance of the lubricating oil is strong and the oil film pressure of the lubricating oil is low. On the other hand, on the friction face 95, since the removing performance of the lubricating oil is weak, the oil film pressure of the lubricating oil is relatively high.

Since the inside toothed disc 92 and the outside toothed disc 93 are positioned between the friction face 94 and the friction face 95, the inside toothed disc 92 and the outside toothed disc 93 tend to be deviatively positioned on the side of the friction face 94 at a lower pressure by the difference in pressure of the oil films formed on the friction faces.

On the contrary, when the outside toothed disc 93 rotates at higher speed than the inside toothed disc 92, the friction material 921 on the friction face 94 rotates at lower speed than the mating face of the opposite outside toothed disc 93. On the friction face 95, the friction material 931 rotates at higher speed than the opposite mating face on the inside toothed disc 92.

Therefore, the moving speed of the lubricating oil lying on the friction face 95 is higher than the moving speed of the lubricating oil lying on the friction face 94.

As a result, on the friction face 95, the removing performance of the lubricating oil is strong and the oil film pressure of the lubricating oil is low. On the other hand, on the friction face 94, since the removing performance of the lubricating oil is weak, the oil film pressure of the lubricating oil is relatively high.

Consequently, the inside toothed disc 92 and the outside toothed disc 93 tend to be deviatively positioned on the side of the friction face 95 at a lower pressure by the difference in pressure of oil films formed on the friction faces.

When such a phenomenon of deviation of the discs occurs, heat is generated by friction in the disc deviated part accordingly. It is not preferable since this causes deterioration of the friction materials and lubricating oil, shortening durable years of the friction disc clutch and the like.

Further, such a disc deviation phenomenon results in relatively large drag torque.

In the conventional one-sided wet friction disc clutch, however, as shown in FIGS. 10 and 11, it is natural to use friction materials having the same groove geometry, and consequently, the above-mentioned problems cannot be dealt with at all.

Means for Solving the Problem

According to the invention, the above-mentioned problems are solved by a combining structure of friction discs of a one-sided wet friction disc clutch in which inside toothed discs and outside toothed discs to both of which friction materials are fixed on one side in the axial direction, respectively, are alternately arranged, characterized in that grooves of different patterns are formed on friction materials on the inside toothed discs and the outside toothed discs, respectively, and removing performance of oil on the friction material on the disc which rotates at lower speed is promoted in a disengagement state of the friction disc clutch.

As specific modes for carrying out the invention, the number of grooves is increased or decreased, the direction of inclination of the grooves is devised, and the like, thereby enhancing the removing performance of the oil on the friction face of the disc which rotates at lower speed.

Operation

In a disengagement state where the inside toothed discs and the outside toothed discs are not engaged with each other, grooves of different patterns are formed on the friction materials fixed to the inside toothed discs and the outside toothed discs, thereby enabling the removing performance of the oil to be adjusted. Consequently, deviation of the discs due to the difference in oil film pressure of the lubricating oil caused by the difference in rotational speed of the discs can be prevented and the drag torque is reduced.

Modes for Carrying Out the Invention

Modes for carrying out the invention will be described hereinbelow with reference to FIGS. 1 to 7.

FIGS. 1 to 7 show examples of combination of discs in which different patterned grooves are formed on the friction materials on the inside toothed discs and the outside toothed discs.

FIG. 1 is a front view of discs such that, in a one-sided wet friction disc clutch in which an inside toothed disc 12 rotates at higher speed than an outside toothed disc 13 in a disengagement state, a friction material 131 on the outside toothed disc 13 which rotates at lower speed has a structure of grooves which are communicated from the inner diameter part to the outer diameter part and inclined so as to follow the rotational direction of the inside toothed disc, and a friction material 121 on the inside toothed disc 12 has a conventional groove structure shown in FIG. 10. "Follow the rotational direction" here denotes the direction which does not disturb the movement from the inside to the outside of oil when the oil given motion by the rotation receives centrifugal force. It is needless to say that "against the rotational direction" denotes the opposite to the above direction. By inclining the grooves formed on the friction material 131 on the outside toothed disc 13 so as to follow the rotational direction as mentioned above, not only the centrifugal force but also shearing force of the oil are used and the oil is easily come off from the friction face in association with the rotation of the inside toothed disc 12, so that the lubricating oil on the friction face 95 in FIG. 9 is easy to be removed. As a result, the unequalness of pressure of the oil films on the friction faces as described in the column of the conventional technique is solved, the deviation of the discs are prevented, and the drag torque is reduced.

FIG. 2 is a front view of discs in a "one-sided" wet friction disc clutch in which an outside toothed disc 23 rotates at higher speed than an inside toothed disc 22 in a disengagement state, a friction material 221 on the inside toothed disc 22 is provided with a structure of grooves communicated from the inner diameter part to the outer diameter part and inclined so as to follow the rotational direction of the outside toothed disc 23 and a friction material 231 on the outside toothed disc 23 is provided with the conventional groove structure shown in FIG. 10.

By inclining the grooves formed on the friction material 221 on the inside toothed disc 22 so as to follow the rotational direction of the outside toothed disc, the oil is easily come off from the friction face in association with the rotation of the outside toothed disc 23, so that the lubricating oil on the friction face 94 in FIG. 9 is easy to be removed. As a result, in a manner similar to the case of FIG. 1, the unequalness in pressure of the oil films on the friction faces as described in the column of the conventional technique is solved, the deviation of the discs is prevented, and the drag torque is reduced.

Figure 3:
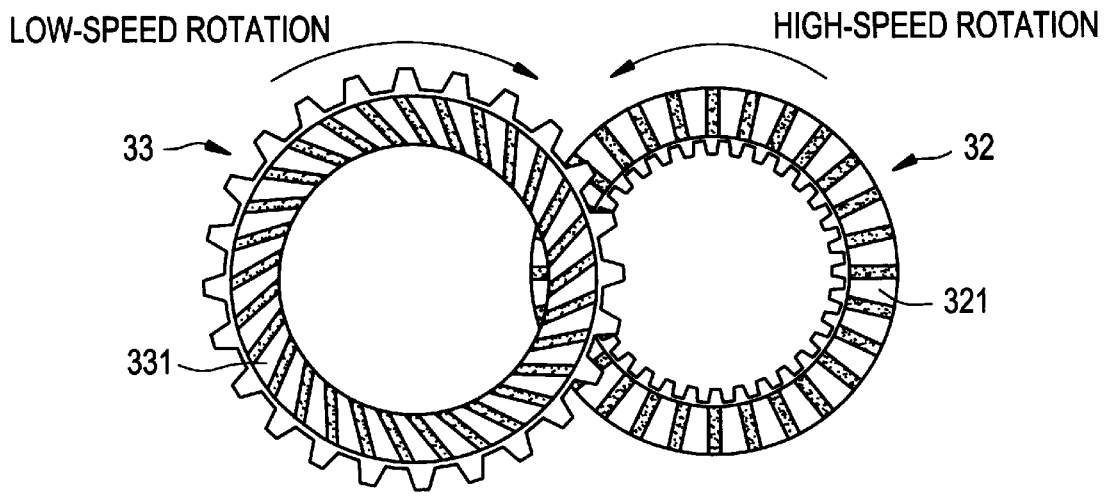
FIG. 3 is a frontal view of a further embodiment when an inside toothed disc rotates at higher speed than an outside toothed disc in a disengagement state.

Discs in FIG. 3 relate to a second embodiment of the inside toothed disc and the outside toothed disc used for a one-sided wet friction disc clutch under the same conditions as FIG. 1.

Grooves similar to those on the friction material 131 in FIG. 1 are formed on a friction material 331 on an outside toothed disc 33 and grooves similar to those on the friction material of the conventional disc in FIG. 11 are formed on a friction material 321 on an inside toothed disc 32. Effects are similar to those in case of FIG. 1.

Figure 4:
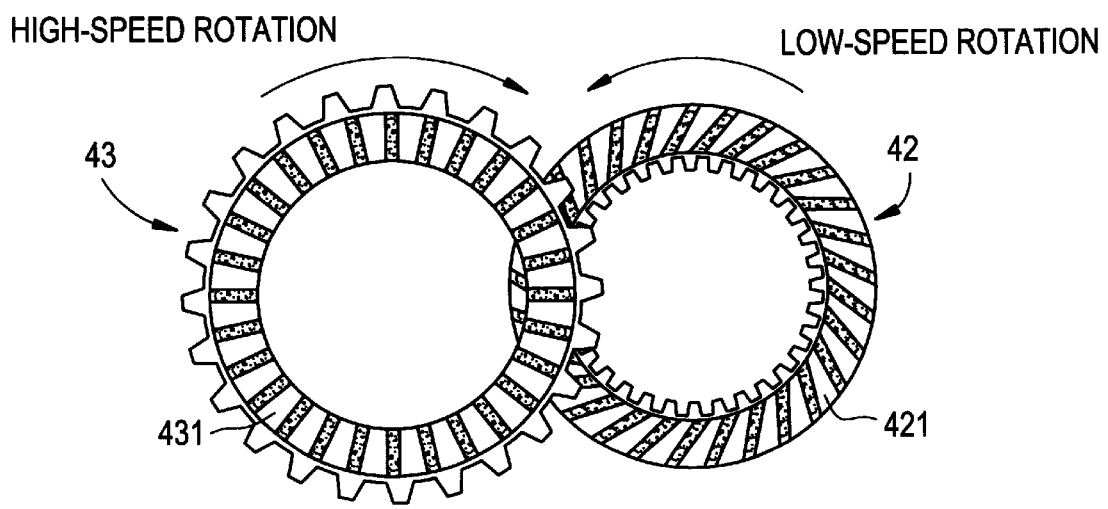
FIG. 4 is a frontal view of a further embodiment when an outside toothed disc rotates at higher speed than an inside toothed disc in a disengagement state.

Discs in FIG. 4 relate to a second embodiment of the inside toothed disc and the outside toothed disc for use in a one-sided wet friction disc clutch under the same conditions as FIG. 2.

Grooves similar to those on the friction material 221 in FIG. 2 are formed on a friction material 421 on an inside toothed disc 42 and grooves similar to those on the friction material on the conventional disc in FIG. 11 are formed on a friction material 431 on an outside toothed disc 3. Effects are similar to those in the case of FIG. 2.

Figure 5:
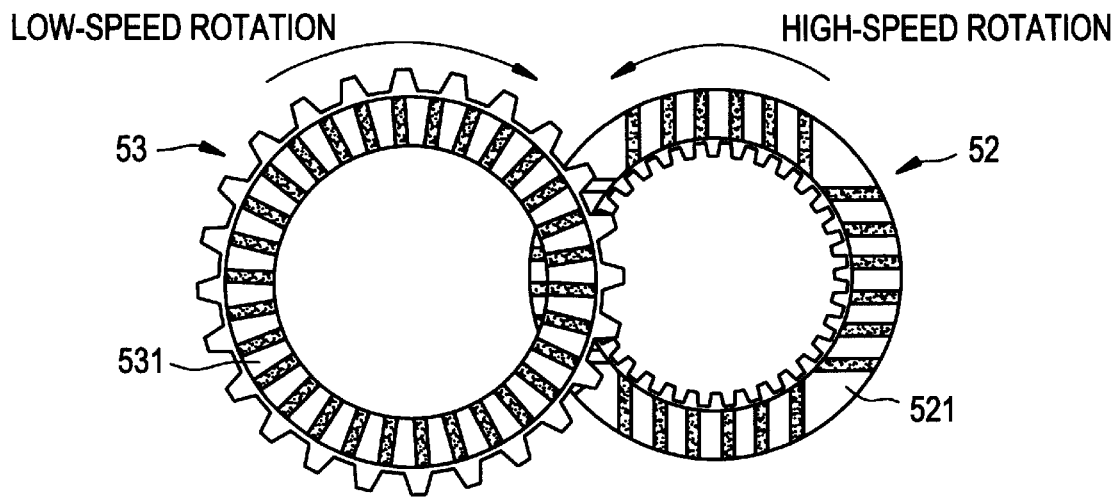
FIG. 5 is a frontal view of a further embodiment when an inside toothed disc rotates at higher speed than an outside toothed disc in a disengagement state.

Discs in FIG. 5 relate to a third embodiment of the inside toothed disc and the outside toothed disc for use in a one-sided wet friction disc clutch under the same conditions as FIG. 1.

The grooves shown in FIG. 10 are formed on a friction material 521 on an inside toothed disc 52 and the grooves shown in FIG. 11 are formed on a friction material 531 on an outside toothed disc 53. As mentioned above, by forming more grooves on the friction material 531 on the outside toothed disc 53 than on the friction material 521 on the inside toothed disc 52, an area from which the lubricating oil is removed by the centrifugal force is enlarged, so that the removal by the centrifugal force is enlarged, so that the removal amount of the lubricating oil on the friction face 94 and that on the friction face 95 can be almost equalized irrespective of difference in rotational speed.

Figure 6:
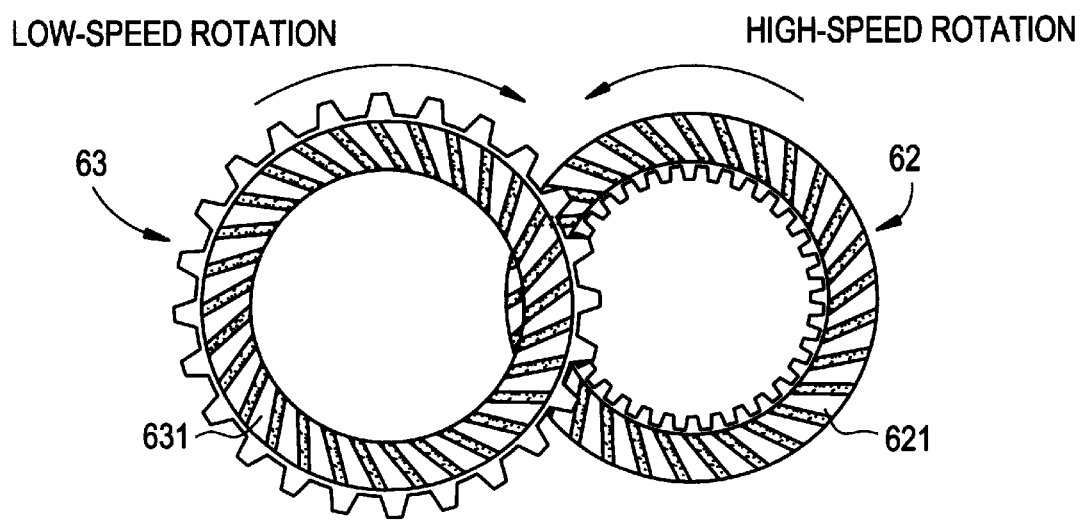
FIG. 6 is a frontal view of a further embodiment when an inside toothed disc rotates at higher speed than an outside toothed disc in a disengagement state.

Discs in FIG. 6 relate to a fourth embodiment of the inside toothed disc and the outside toothed disc for use in a one-sided wet friction disc clutch under the same conditions as FIG. 1.

A friction material 631 on an outside toothed disc 63 is provided with a structure of grooves inclined so as to follow the rotational direction of the disc and a friction material 621 on an inside toothed disc 62 is provided with a structure of grooves inclined against the rotational direction of the disc contrary to the grooves of the friction material 631 on the outside toothed disc 63.

Effects are the same as those in the case of FIG. 1. By inclining the grooves formed on the friction material 621 on the inside toothed disc 62 so as to be against the rotational direction, the lubricating oil on the friction face 94 is not easily removed, thereby enabling the degree of removal of the oil between the friction faces to be remarkably changed. Consequently, the unequalness in oil film pressure can be effectively solved, the deviation of the discs is prevented, and the drag torque is reduced.

Figure 7:
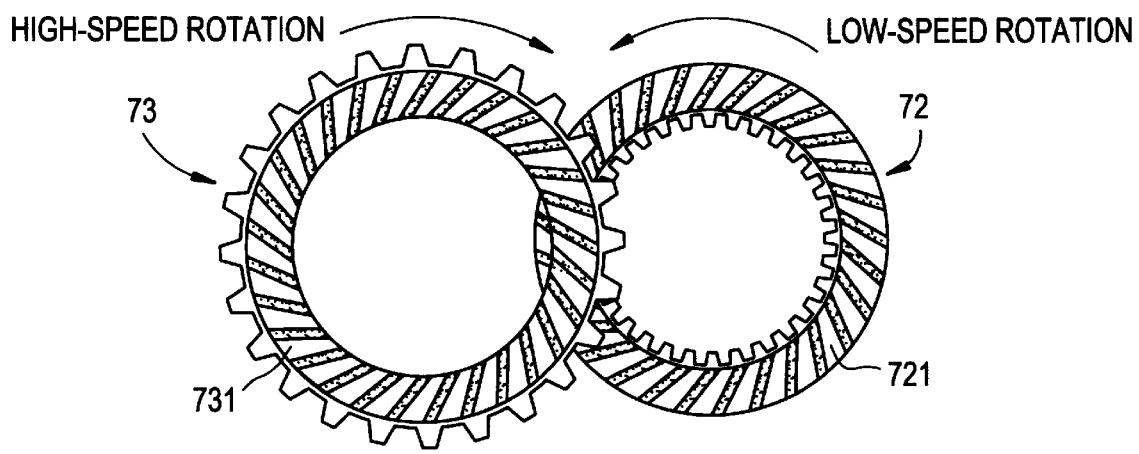
FIG. 7 is a frontal view of a further embodiment when an outside toothed disc rotates at higher speed than an inside toothed disc in a disengagement state.

Discs in FIG. 7 relate to a third embodiment of the inside toothed disc and the outside toothed disc for use in a one-sided wet friction disc clutch under the same conditions as FIG. 2.

A friction material 721 on an inside toothed disc 72 is provided with the groove structure inclined so as to follow the rotational direction of the disc and a friction material 731 on an outside toothed disc 73 is provided with the groove structure inclined so as to be against the rotational direction of the disc contrary to the grooves of the friction material 721 on the inside toothed disc 72.

Effects are the same as those in the case of FIG. 2. By inclining the grooves formed on the friction material 731 on the outside toothed disc 73 so as to be against the rotational direction, the lubricating oil on the friction face 95 is not easily removed and the degree of removal of the oil on the friction faces can be remarkably changed. Consequently, the unequalness in oil film pressure can be more effectively solved, the deviation of the discs is prevented, and the drag torque is reduced.

Figure 8:
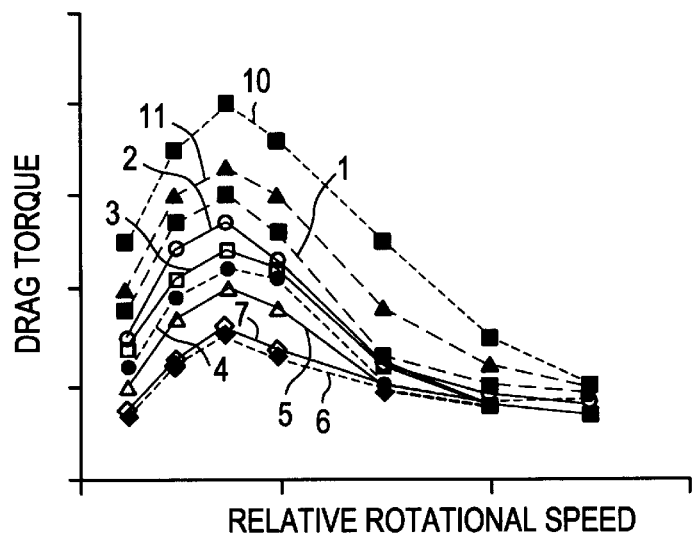
FIG. 8 is a comparison diagram of drag torque in case of the embodiments of the invention and the conventional examples.

FIG. 8 is a diagram showing the relation between relative rotational speed and drag torque with respect to the embodiments of the invention and the conventional examples for comparison.

Numerals 1 to 7, 10 and 11 in FIG. 8 show the relations between the relative rotational speed and the drag torque in the cases of using the discs shown in FIGS. 1 to 7, 10 and 11, respectively.

It is understood from the above that, according to the invention, there is the effect on reduction of the drag torque. It is considered that the reason is that the dragged ratio of one disc by the other disc is reduced due to elimination of the deviation of the discs.

It is known that the friction disc on which grooves following the rotation direction are formed has a high coefficient of friction in the early period of engagement and is very sticky and, on the contrary, the friction disc on which grooves against the rotational direction are formed has a low coefficient of friction in the early period of engagement and is not so sticky. Since the coefficient of friction in the early period of engagement is easily influenced by the shape of grooves formed on the friction disc, friction characteristics can be controlled by design of the shape of grooves on the friction disc. Therefore, according to the invention, the combinations of grooves as shown in FIGS. 1 to 7 can be selected according to desired friction characteristics.

Effects of the Invention

As mentioned above, according to the invention, there is the effect that the deviation of discs due to the oil film pressure difference of the lubricating oils lying on the friction faces due to the difference in relative rotational speed of the inside toothed disc and the outside toothed disc in the disengagement state where the lacing discs are not engaged with each other can be prevented.

As a result, the drag torque can be reduced.

The groove shapes are combined according to the required friction characteristics, thereby enabling the friction characteristics to be controlled.

Explanation of the Reference Numerals

10: one-sided wet friction disc clutch
12, 22, 32, 42, 52, 62, 72: inside toothed discs

13, 23, 33, 43, 53, 63, 73: outside toothed discs

Although the invention has been described in its preferred embodiment with a certain degree of particularity, it is to be understood that numerous changes can be made without deviating from the invention as hereinafter claimed.

What is claimed:

1. A combining structure of friction discs of a one-sided wet friction disc clutch in which inside toothed discs and outside toothed discs to which friction materials are fixed on only a single side in the axial direction, respectively, are alternately arranged, one of which discs rotates slower than the other and characterized in that grooves of different patterns are formed on the friction materials on both of the inside toothed disc and the outside toothed disc and removal of oil from the friction material on the disc which rotates at a lower speed in a disengagement state of the friction disc clutch is promoted.

2. The combining structure of friction discs of the one-sided wet friction clutch according to claim 1, the discs having a number of grooves, one disc rotating at a higher speed, wherein the number of grooves on the friction material on the disc which rotates at lower speed in the disengagement state is larger than the number of grooves on the friction material on the disc which rotates at a higher speed.

3. The combining structure of friction discs of the one-sided wet friction disc according to claim 1, wherein when the inside toothed disc rotates in a rotating direction at a lower speed in a disengagement state with grooves communicating from the inside part to the outer diameter part formed on the friction material on the outside toothed disc are inclined so as to follow the rotational direction of the inside toothed disc.

4. The combining structure of friction discs of the one-sided wet friction disc clutch according to claim 1, the grooves communicate from the inside diameter part to the outside diameter part on the friction material to create an additional direction wherein the outside toothed disc rotates at a lower speed and grooves are inclined so as to follow the rotational direction of the outside toothed disc.

5. The combining structure of friction discs of the one-sided wet friction disc clutch of claim 1, wherein the grooves of the friction material on the disc which rotates at lower speed are inclined so as to follow the inside part to the outside diameter part and the grooves of the friction material on the disc which rotates at higher speed are inclined so as to be against the rotational direction.

* * * * *